R. V. HEUSER.
REFRIGERATING DEVICE.
APPLICATION FILED JAN. 22, 1910.
992,560.
Patented May 16, 1911.
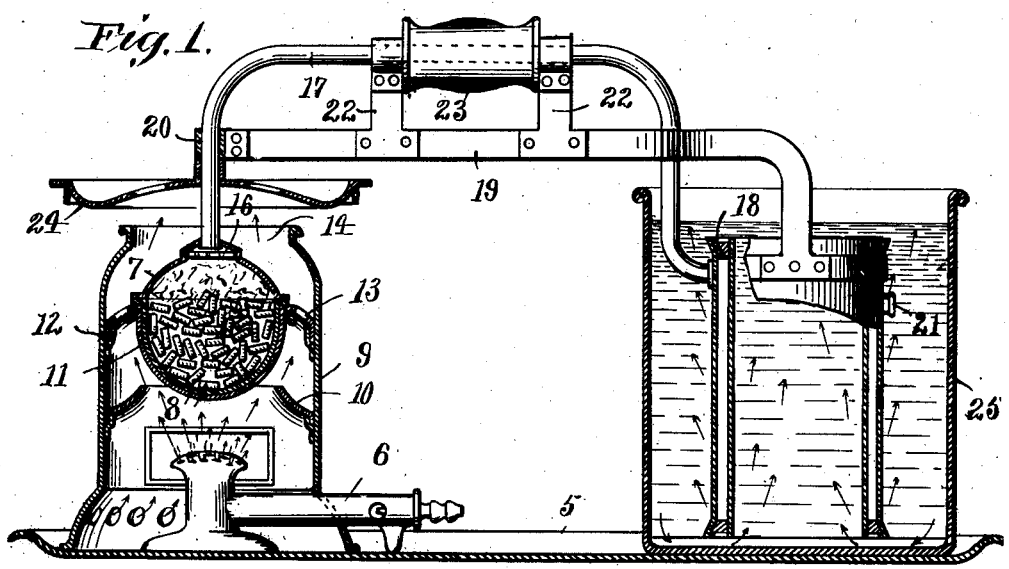
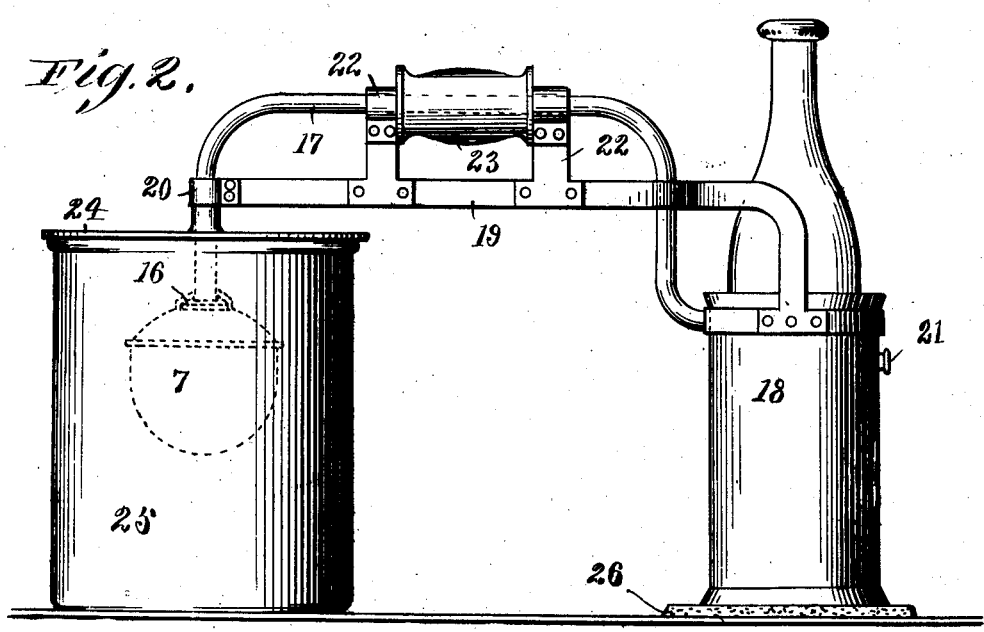
Inventor
Ralph V. Heuser

UNITED STATES PATENT OFFICE.

RALPH V. HEUSER, OF WATERBURY, CONNECTICUT.

REFRIGERATING DEVICE.

992,560.  Specification of Letters Patent. Patented May 16, 1911.

Application filed January 22, 1910. Serial No. 539,475.

*To all whom it may concern:*

Be it known that I, RALPH V. HEUSER, a subject of the Republic of Switzerland, and resident of Waterbury, in the county of New Haven and State of Connecticut, have invented certain new and useful Improvements in Refrigerating Devices, of which the following is a specification.

My invention relates to refrigerating devices and belongs to that class of apparatus known as ammonia refrigerators of the absorption type.

It is the purpose of the invention to provide a machine of the above class which will be particularly well adapted for cooling bottled beverages and especially the several kinds of effervescent drinks, or water when contained in either bottles or an open vessel.

It is a further object of my invention to provide a simple form of refrigerating apparatus that may be inexpensively manufactured and requires but little skill to operate; to make the device comparatively small in proportion to the capacity of the machine, and likewise light to handle thereby adapting it to be packed up and transported as a part of a camping outfit or to be generally used for domestic or other purposes.

The absorption of the ammonia gas in my present device, is effected by means of dry calcium chlorid, which possesses two important qualities which make it eminently fitting for this application and which are first a high absorbing medium, and second a solid body. The first named means affords a high efficiency for a given size of refrigerator and the last named facilitates the construction as will be evident from the further description.

With the above objects in view I have devised the simple and novel construction shown upon the accompanying drawings forming a part of this specification upon which similar characters of reference denote like or corresponding parts throughout the several figures and of which, Figure 1, shows a central vertical longitudinal sectional view through my refrigerating apparatus as in the first operation of heating the calcium chlorid and gases confined therewith. Fig. 2, is a side elevation of the device illustrated in Fig. 1, but in a different position representing the second operation and a bottle within the refrigerator as in the act of being cooled, and Fig. 3, shows an enlarged side view of one of the cartridges employed within the machine for containing the calcium chlorid.

The apparatus consists in part of a receptacle designed to contain calcium chlorid and ammonia, a liquefier connected with the receptacle, a heater and connections whereby the said receptacle may be heated and the liquefier cooled during the preliminary operation of the apparatus. This cooling being effected by submerging the said liquefier in a tank of water which subsequently serves also the purpose to cool the receptacle for the calcium chlorid in the second operation.

Referring in detail to the characters of reference marked upon the drawings 5 represents a suitable tray upon which the refrigerating outfit may be mounted for use as shown in Fig. 1.

6 represents a gas or other burner designed to produce a flame for heating a kettle 7 and the active mass contained in the calcium chlorid cartridges 8. This kettle is inclosed by a suitable heater casing 9 having an annular deflector 10 mounted therein to drive the heat against the underside of the basin 11 for supporting the kettle before mentioned. The basin is shaped to conform to the underside of the kettle and is secured to the sides of the heater casing as shown at 12. A series of perforations are formed in the flanged portion 13 of this basin to permit the heat to pass up around the basin and out through the open top 14 of the heater. The kettle is made of two parts the larger one of which is first filled with the cartridges referred to and then the two are riveted together and made hermetically tight by means of hard soldering.

The cartridges referred to are made by coiling a fine annealed iron wire very closely into the shape of a hollow cylinder. The end portions of such cylinders being closed by means of caps 15 that are screwed or pressed onto the end portion of the said wire cylinders. These cartridges are preferably filled with dry calcium chlorid which tends to contract and expand by the change in temperature thus causing the ammonia to be accordingly acted upon. These cartridges are obviously flexible better to permit the ammonia gas, with which the kettle and connected parts are further charged, to reach the active mass, in the interior of the cartridges. The space between the cartridges as well as that above the same within the kettle is further filled with fibrous asbestos, mineral wool or other suitable material, and a perforated cap 16 is placed over the top of the same to protect these materials from entering the pipe 17 which connects the kettle with an annular liquefying or cooling chamber 18. This cooler is hermetically sealed and supported in part by a metal bracket 19 one end of which is secured thereto and the other end 20 of which is attached to the vertically disposed portion of the connecting pipe 17. This bracket is formed of two parts that are secured together along their central portion and end 20, and are divided and disposed outward at the other end to straddle the pipe 17 and engage the opposite sides of the cooler.

A nipple 21 having a screw cap may be provided in the cooler for extracting the air, as by means of a vacuum pump, preparatory to introducing the dry ammonia gas. Upwardly disposed branches 22 secured to the bracket serve to support the horizontal portion of the said pipe. Intermediate of these branches 22 and upon the said pipe is placed a handle 23 which as will be seen is substantially intermediate of the apparatus and so located and arranged as to readily serve to conveniently balance and support the several parts when engaged by an operator. A cover 24 is connected to the vertical portion of the pipe 17 just beneath the end 20 of the bracket 19 and serves to inclose and rest upon the tank 25 when the tank is shifted from the position shown in Fig. 1, to the position shown in Fig. 2 as in the second part of a cooling operation. This cover may be provided with a series of holes through which the heat may pass when the parts are in the position shown in Fig. 1. The annular cooler 18 as well as the remainder of the apparatus may be proportioned to accommodate bottles or vessels of different sizes, which means that the inside diameter of the cooler would be but slightly larger than the outer diameter of the bottle to be placed therein so that when arranged for cooling the bottle would be closely but freely contained within the cooler better to expose the bottle and its contents to the action of the fluid within the cooler and whereby the contents of the bottle would quickly become cooled as desired.

It will be obvious that if the liquid to be cooled is contained within an open vessel the liquefier may be submerged within the water as contained in said vessel, instead of the vessel being located within the annular walls thereof as herein shown. In this connection it may also be stated if used in this way, submerged within a vessel, the said liquefier may be of any preferred shape and does not necessarily need to be annular in form as illustrated in the drawings.

The operation of my refrigerating apparatus would be as follows: With the machine in the position shown in Fig. 1 the burner is lighted and allowed to burn for a short time say five to ten minutes, thereby heating the kettle and its contents, and causing the temperature to rise whereby the ammonia is expelled from the active mass effecting a proportionate rise in pressure within the whole apparatus until the ammonia passes into the liquid state in the so-called liquefier. As the heat of compression as well as the heat evolved from the change of the gaseous into the liquid ammonia is constantly carried off into the cooling water (being of ordinary temperature) surrounding the said liquefier there will be no further increase in pressure while the precipitation of liquid goes on. After the apparatus has been heated as above stated and nearly all ammonia converted into liquid form the flame is extinguished preparatory to cooling the kettle whereby the calcium chlorid recovers its faculty to absorb the ammonia until the definite compound $CaCl_2.8NH_3$ is formed. This cooling is best effected in the most rapid manner by lifting the kettle out of its casing and submerging it in the tank 25 previously used for cooling the liquefier, the contents of which need not be exchanged for this purpose. As is seen in Fig. 2 the liquefier is now placed upon a heat-insulating material 26, felt or the like, and absorbs the heat required for the evaporation of the liquid ammonia from the surrounded bottle with contents thereby cooling it very rapidly. The evaporation of the liquid ammonia is made possible as the pressure disappears in conformity with the continuous absorption of the active mass contained in the cartridges. On the other hand this absorption of the ammonia in the calcium chlorid is accompanied by a considerable rise in temperature which explains the necessity of cooling the kettle during the second stage of operation. In particular cases, namely, when it is desired to effect a rather long continued cooling of the mass to be refrigerated (cold storage), it is unnecessary to accelerate the withdrawing of the heat of absorption from the active mass by means of cooling water but on the contrary it may be better to prevent an escape of heat by means of a heat-insulating jacket.

Having thus described my invention what I claim and desire to secure by Letters Patent is:—

1. In a refrigerating apparatus of the class described, the combination of a heater receptacle and connected liquefier of a quantity of cartridges formed of wound wire cylinders filled with a suitable absorbent, within the receptacle.

2. In a refrigerating apparatus of the class described, the combination with a heater receptacle and connected liquefier, of a quantity of cartridges formed of wound wire cylinders filled with a suitable absorbent, within the receptacle, and means for connecting the heater receptacle and liquefier in a way to make them portable.

Signed at Waterbury, in the county of New Haven, and State of Connecticut this 13th day of January, A. D. 1910.

RALPH V. HEUSER.

Witnesses:
MARTIN L. CAINE,
HUMBERT E. MANGINI.